United States Patent
Mead et al.

(10) Patent No.: US 9,061,379 B1
(45) Date of Patent: Jun. 23, 2015

(54) GROMMET INSTALLATION TOOL

(75) Inventors: William T. Mead, Long Beach, CA (US); Dennis Bowles, Fullerton, CA (US); Steve Ortiz, Lke Elsinore, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 649 days.

(21) Appl. No.: 13/507,075

(22) Filed: Jun. 1, 2012

(51) Int. Cl.
*B21D 31/00* (2006.01)
*B23P 11/00* (2006.01)

(52) U.S. Cl.
CPC .................... *B23P 11/005* (2013.01)

(58) Field of Classification Search
CPC ..... B23P 11/005; B21D 39/04; A43D 100/02
USPC .......... 29/243.517, 243.518, 253, 256, 283.5, 29/283, 522.1, 524.1, 525.05; 411/15, 24, 411/34, 35, 37, 44, 49, 55, 57.1, 70, 76; 72/391.2, 391.4
See application file for complete search history.

(56) References Cited

U.S. PATENT DOCUMENTS

| | | | | |
|---|---|---|---|---|
| 1,356,401 A | * | 10/1920 | Peirce ............................ | 411/24 |
| 3,543,560 A | * | 12/1970 | Harris ...................... | 29/243.521 |
| 4,691,552 A | * | 9/1987 | Peterson .................. | 29/243.521 |
| 4,724,608 A | * | 2/1988 | Parrott ............................. | 29/724 |
| 4,811,590 A | * | 3/1989 | Cheung ........................ | 72/481.3 |
| 4,829,804 A | * | 5/1989 | Strobel ......................... | 72/391.2 |
| 4,904,133 A | * | 2/1990 | Wright ............................. | 411/43 |
| 5,197,838 A | * | 3/1993 | Schwab ........................... | 411/43 |
| 5,231,748 A | * | 8/1993 | Knudson et al. ......... | 29/243.517 |
| 5,367,759 A | * | 11/1994 | Loew et al. ...................... | 29/512 |
| 5,815,906 A | * | 10/1998 | Johnsen ....................... | 29/524.1 |
| 6,705,149 B2 | * | 3/2004 | Cobzaru et al. .............. | 72/391.4 |

* cited by examiner

*Primary Examiner* — Lee D Wilson
*Assistant Examiner* — Jamal Daniel
(74) *Attorney, Agent, or Firm* — Tarolli, Sundheim, Covell & Tummino LLP

(57) ABSTRACT

The improved installation tool for installing grommets in a hole in a panel having a countersink end includes an anvil having a convex surface for contacting the head of the grommet after the grommet is installed in the hole. A flaring die having a tapered tubular portion for inserting into the grommet is mounted on the open end there in and chamfered surface for deforming the end of the grommet so that it is deformed into the countersink. This is accomplished by a threaded rod that extends through a hole in the anvil, grommet and threadably engages internal threads in the die. Withdrawing of the rod causes the die to be moved against the grommet and flares the end of the grommet into the countersink and locks it in place.

7 Claims, 4 Drawing Sheets

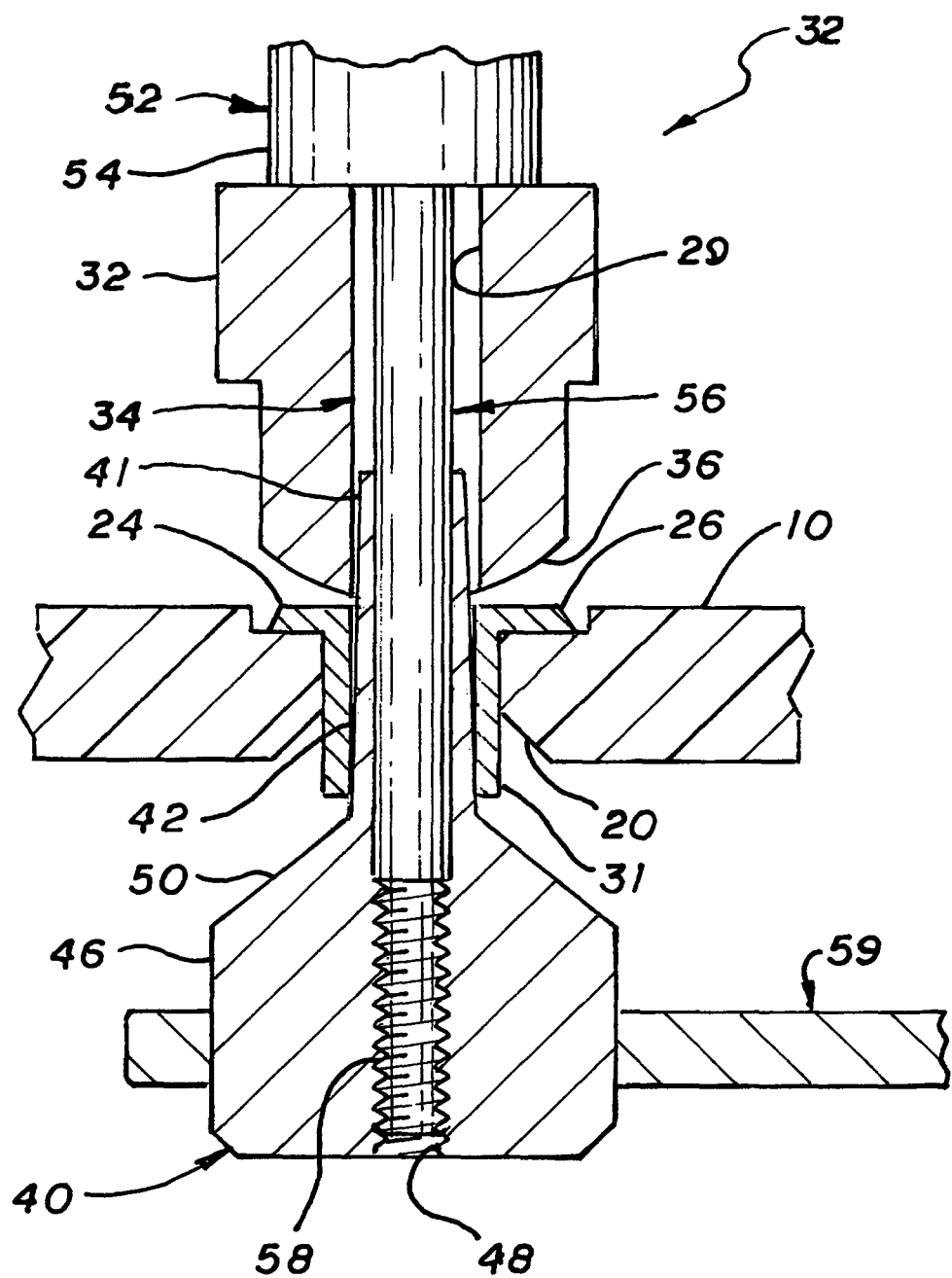

GROMMET INSTALLATION TOOL

FIELD OF INVENTION

The invention relates to the field of fastener installation tools and, in particular, to an improved tooling for installing grommets in structures.

BACKGROUND OF THE INVENTION

When fasteners are to be installed in structures such as panels and the like, often grommets are permanently installed the holes to accommodate fasteners. The usual procedure is drill the hole oversize and countersink one end. The grommet comprises a head portion at one end of a hollow tube having an outer diameter sized to fit in the hole and an internal bore having a diameter sized to receive the fastener. The grommet is installed from one side of the structure until the head portion contacts the panel and the opposite end extends out of the countersunk end. The opposite end is then deformed so as to extend into the countersink, thus locking the grommet into the panel.

Grommet installation tooling has been adapted from blind nut installation equipment manufactured by HS Tooling Corporation, Gardena, Calif., U.S.A. The modified tooling comprises an anvil (the modification) that abuts the installed grommet head and a flaring die that is portioned on the open end at the countersink end of the hole in the structure. A power tool having a threaded shaft is inserted thru the anvil, through the grommet hole and threaded to the flaring die. The flaring die includes a cylindrical portion that is adapted to slidably engage the grommet hole and a chamfered portion matching the countersink end of in the panel. The die also includes a thread hole there through.

In operation, a grommet is installed in the hole. The anvil is portion on the head portion of the grommet and the flaring die on the opposite end. A threaded member connected to a power tool is passed through the anvil and threadably engaged to the die. The power tool (typically hydraulically actuated) is activated, thus causing the die to engage the end of the tube deforming it so as to engage the counter sink end in the panel. Note that to prevent rotation of the die, the die includes a hex shaped surface that can be griped by a pliers or the like. In addition, the tool can be manually operated by use of wrenches and the like.

While this tooling is capable of installing the grommet in the panel, there is often a problem of the die becoming stuck in the center of the tube portion of the tube. This requires that the installer pry the die out of the tube or use a soft face mallet to dislodge it. This is a time consuming operation. It can also damage the grommet requiring the grommet to be removed and replaced.

Therefore, it is a primary object of the invention to provide an improved installation tooling for grommets.

It is another primary object of the invention to provide an improvements to existing tooling for installing grommets.

It is a further object of the invention to provide improved tooling for installing grommets that eliminates the sticking of the die to the grommet upon the installation thereof.

SUMMARY OF THE INVENTION

An improved tool assembly is disclosed for installing a grommet inserted in a hole in a panel. The hole in the panel includes a first end and a second end having a tapered countersink portion. The grommet to be installed includes a tubular body with an internal bore and a head portion abutting the first end of the panel and the second end extending out of the second end of the panel. The grommet is usually bonded the hole in the panel by means of an adhesive applied to the hole prior to insertion of the grommet.

The improved tool assembly comprises an anvil having a bore there through and a convex curved surface for contacting the head of the grommet such that the curved surface contacts only the area of the head about the internal bore of the grommet. The radius of curvature of the convex surface is between 8.1 and 13 inches. A flaring die is provided for flaring the second end of the grommet into the counter sink portion of the panel, the flaring die having a tapered tubular portion for inserting into the second end of the grommet, a conical surface for flaring the second end of the grommet and a griping surface for preventing rotation of the die when griped and an internal threaded hole there though. The taper angle is between 0.266 and 0.443 degrees. The surface finish of the tapered tubular portion is 16 RMS. A power tool with a rod, having external threads, is engagable with the internal threaded hole of the die.

Thus with the anvil in contact with the head portion of the grommet the power tool is actuated to rotate the threaded mandrel rod and engage the internal threads of the die. A wrench engaging the griping surface of the die prevents rotation thereof. A second actuation of the power tool causes the rod to retract, which in turn causes the die to move into the second end of the grommet flaring it into contact with the counter sink portion of the hole in the panel locking the grommet in place. A third actuation of the power tool cause the rod to rotate in the opposite direction disengaging it from the die. The die, which remains engaged with the grommet can now be easily removed with a pliers and light hand pressure.

A hand operated version is similar to the above described invention, but uses a bolt instead of a rod. The bolt is threadably engaged with the flaring die and a wrench can be used to rotate the bolt.

The critical features of the improved grommet installation tooling are the curved surface on the anvil and the tapered tubular portion of the die. This has eliminated the die becoming stuck in the grommet after installation. With the prior art tooling a significant percentage of dies became jammed in the grommet. The improved tooling eliminates jamming and thus, provides a significant reduction in production costs.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a view similar to FIG. 1 wherein the improved tooling is shown installed and ready to flaring the grommet and locking it in place.

DETAILED DESCRIPTION OF THE INVENTION

Figure 1:
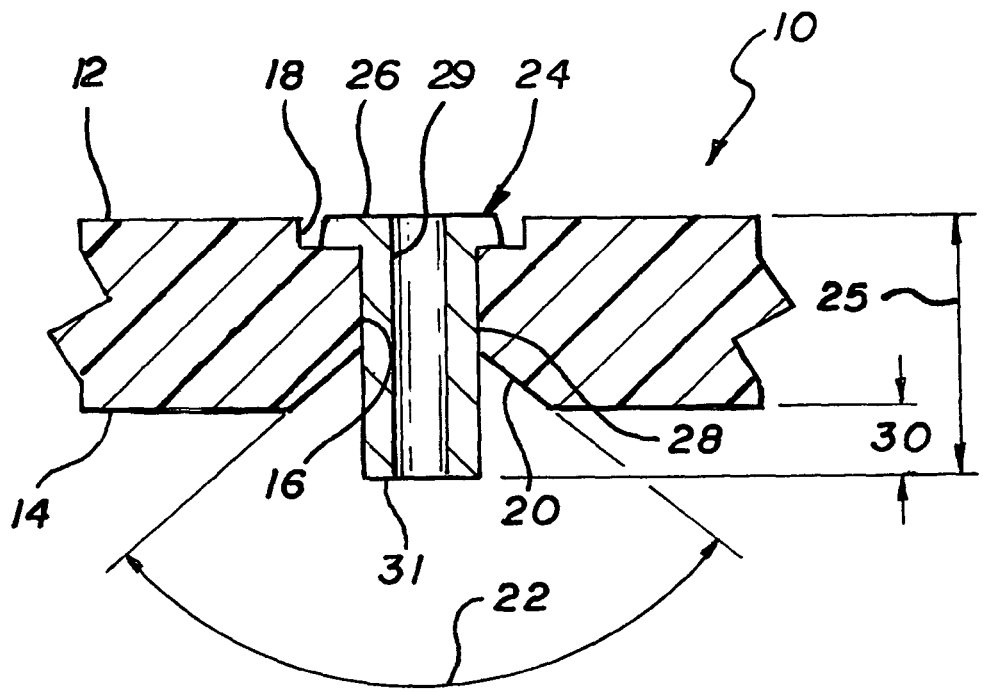
FIG. 1 is a partial cross-sectional view of a panel with a grommet installed in a fastener hole prior to deforming the grommet in place.

Referring to FIG. 1 in which is a partial view of a structure and in this case a panel made of composite material, indicated by numeral 10. The panel 10 has first and second principle sides 12 and 14. Typically, if such a composite panel is going to have fasteners installed there, particularly if the fastener will be periodically removed, a grommet is used as a liner to the fastener hole. As illustrated, a fastener hole 16 extends there through, which has a counterbore 18 on side 12 and a tapered countersink 20 on side 14. The countersink 20 has a total included angle 22 of typically 100 degrees. Note that a counterbore 18 is not necessary in all cases.

Grommet 24, prior to be locked in place, is shown installed in the hole 16. The grommet 24 has an overall length 25 and includes a head portion 26 within the countersunk 18 and a tubular portion 28 extending out of the second side 14 of the panel 10 and an internal bore 29 extending through the head portion 26 and tubular portion 28 and having a diameter 29A. The distance 30 that the end 31 of tubular portion 28 extends out the side 14 is just sufficient so as to fill the countersink 20 when flared there into, which will be subsequently discussed. Typically, the grommet is made of alloys of steel such as 304 or 321 Cres alloys, Furthermore, the grommet is usually bonded in place by an adhesive applied to the both counterbore and the countersink at each end of the hole in the panel prior to insertion of the grommet, providing sealing about the hole once the grommet is permanently locked in place.

Figure 4A:
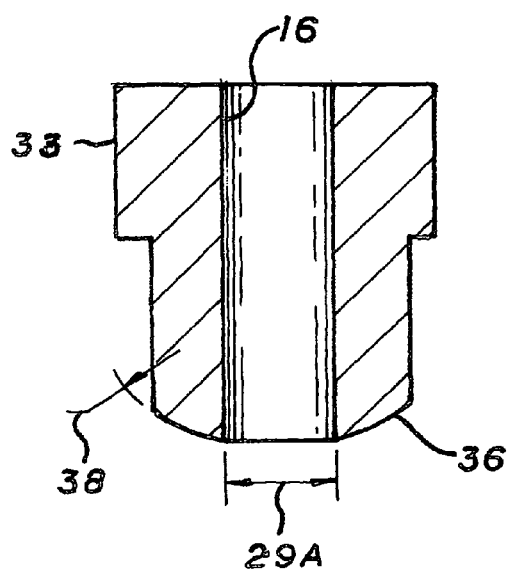
FIG. 4A is a cross-sectional view of the anvil.
Figure 5A:
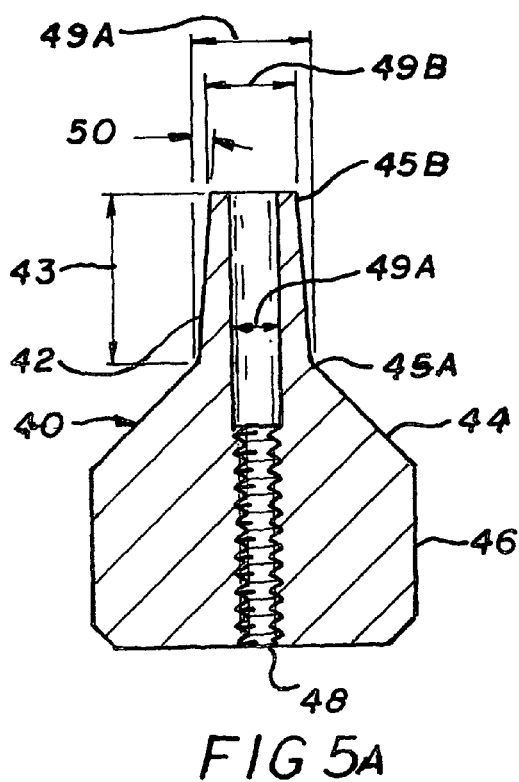
FIG. 5A is a cross-sectional view of flaring die.

Referring to FIGS. 2, 4A and 5A, the improved tooling, generally indicated by numeral 32 is shown installed about the grommet 24 and panel 10. It comprises an anvil 32 having a bore 34 there through and a convex curved surface 36 with a radius of curvature, indicated by numeral 38, for contacting the head portion 26 of the grommet 24 such that the curved surface 36 contacts only the area of the head portion 26 about the internal bore 29 of the grommet 24. The radius of curvature 38 of the convex surface is between 8.8 and 13.1 inches and preferably 11.6 inches. A flaring die 40 is provided for flaring the second end 31 of the grommet 24 into the counter sink portion 20 of the panel 10. The flaring die 40 includes a tapered tubular portion 42, having a length 43 which is longer than the length 25 of the grommet 23, for inserting into the second end 31 of the grommet 24, The die 40 further includes a conical surface 44. At end 45A of the tubular portion 40 for flaring the second end of the grommet 24 and a hex shaped griping surface 46 for preventing rotation of the die when griped and an internal threaded hole 48 there though. The tubular portion 40 from end 45A to end 45B is tapered at a taper angle 50, which is between 0.266 and 0.443 degrees. The difference in diameter 49A at end 45A and diameter 49B at end 45B of the tapered tubular portion 42 is only 0.005 over a length of 0.32 inches. With diameter 49A only 0.002 smaller than the diameter 29A of the bore 29 of the grommet 24 even at the end 49B, the fit is tight. The surface of the tapered tubular portion 42 is 16 RMS. A power tool 52 (preferably hydraulically actuated) with a chuck 54 mounts a threaded rod 56, having external threads 58, is engagable with the internal threaded hole 48 of the die 40.

Figure 3:
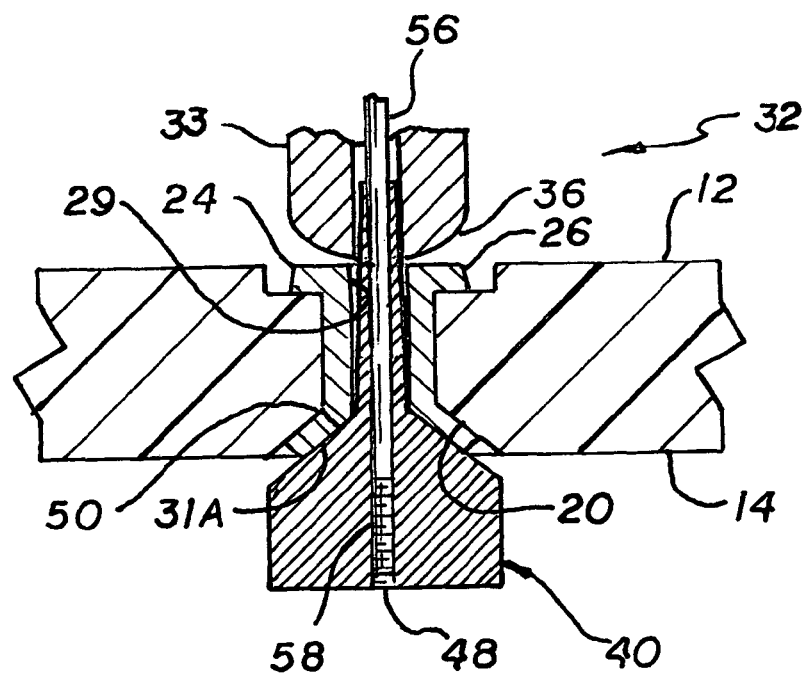
FIG. 3 is a view similar to FIG. 2 illustrating the grommet flared locking it in place by the improved tooling.

Still referring to FIG. 2, 4A and 5A and additionally to FIG. 3, the anvil 33 is brought in contact with the head portion 26 of the grommet 24 and the threaded rod 56 extending through the bore 34 thereof and through the grommet 24 and threadably engaged with the internal threads threaded hole 48 of the die 40, the actuation of the power tool 52 causes the threaded rod 56 to rotate causing the die 40 to move into the second end 31 of the grommet and the conical surface 44 flaring it into contact with the countersink 20 of the hole 16 of the panel 10 locking the grommet in place. A wrench 59 engaging the griping surface 46 prevents rotation of the die 40 during the flaring operation.

Figure 4B:
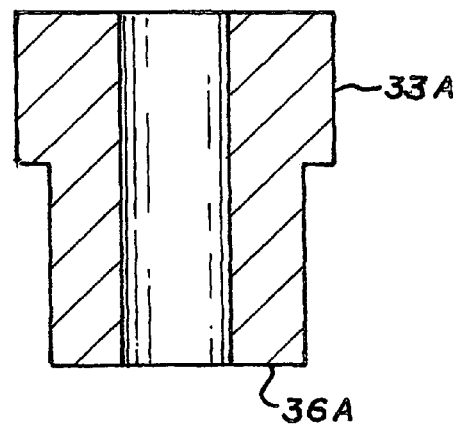
FIG. 4B is a cross-sectional view of the prior art anvil.
Figure 5B:
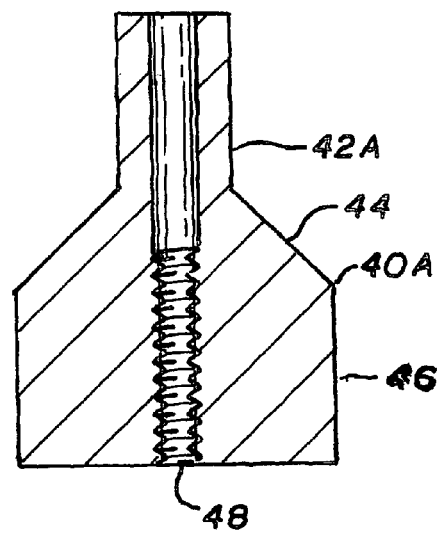
FIG. 5B is a cross-sectional view of the prior art flaring die.

Referring particularly to FIGS. 4B and 5B the prior art anvil 32A has a flat surface 36A for contacting the grommet. The prior art flaring die 40A has a non-tapered tubular surface 42A. The finish on the surface 42A is typically 32 RMS.

Figure 6:
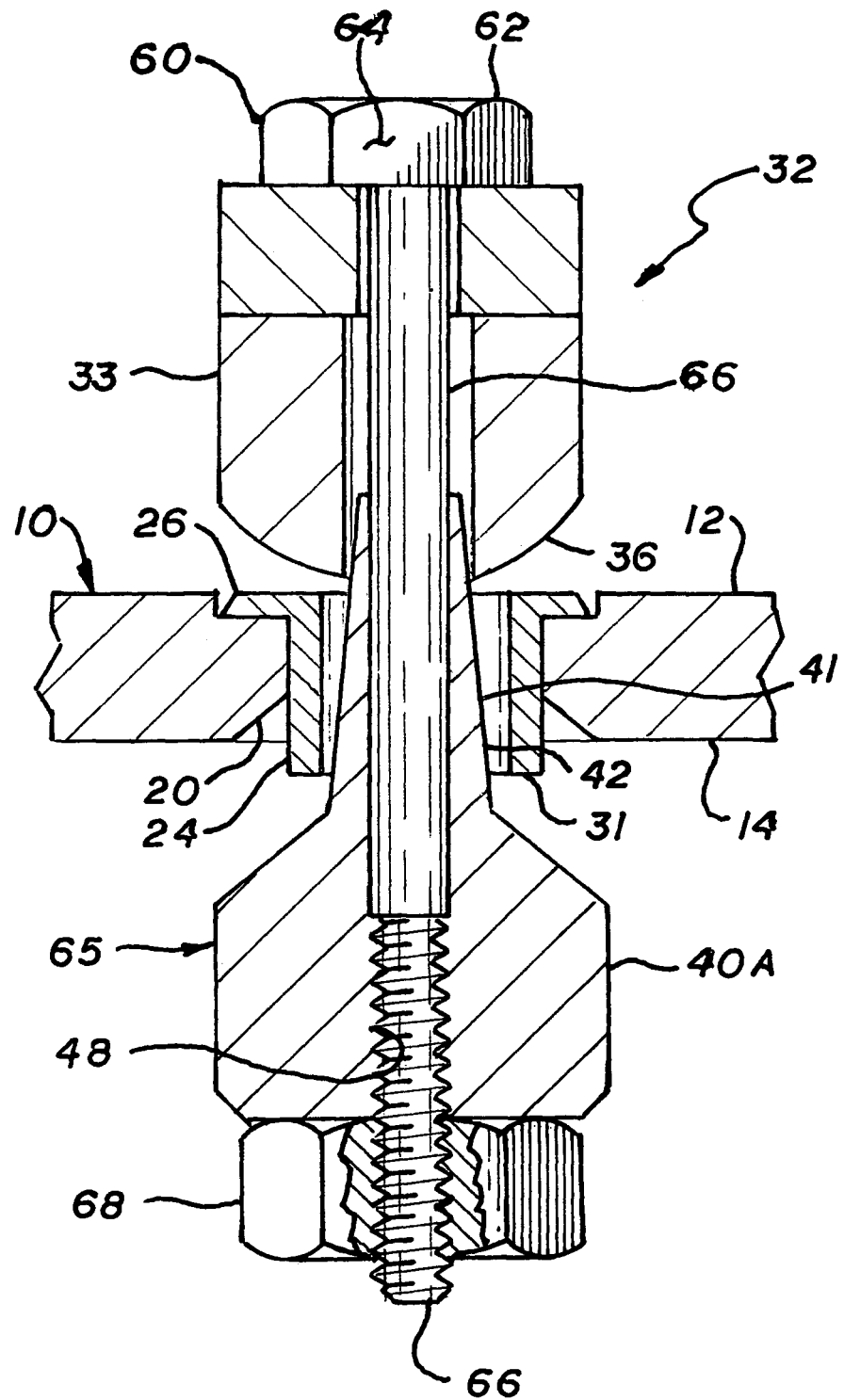
FIG. 6 is a cross-sectional view of a hand operated version of the improved tool.

Presented in FIG. 6 is a hand operated version of the tool, indicated by numeral 60, which differs only in that the a bolt 50 having a head portion 62 incorporating wrenching flats 64. The bolt shaft 66 is threaded and is shown engaged to the flaring die 40 and extends there through and thereafter engages a nut 68. The nut 68 is optional, providing increased resistance to the die 40 rotation. All other features are identical to the previous example shown in FIG. 2. Thus rotation of the bolt 60 by means of a wrench (not shown) applied to the wrenching flats 64 will cause the flaring die 40 to deform the second end 31 of the grommet 24 into the countersink 20 locking it in place.

The use of the anvil 33 with it's curved surface 36 and the die 40 with its tapered tubular portion 42 having a 16 RMS surface 41 provides the following results:

1. 100% elimination of Tool jamming yielding productivity time savings 20 hours/SS or week
2. No galling of flaring die.
3. No Oil or grease required to reduce tool jamming.
4. Eliminated the prior art tooling's need for the addition of grease or oil which would dis-bond the grommet and produce spinning grommets when a fastener was installed and torqued.
5. Eliminated the prior art tool jamming, which would break 25% of the threaded mandrel rods. This was because the prior art tooling would not allow swaging forces of the flaring die and anvil during the swaging operation to be realigned during the swaging operation resulting in breaking of the mandrel rod.
6. The countersink included angle of the grommet is improved.

While the invention has been described with reference to a particular embodiments, it should be understood that the embodiments are merely illustrative as there are numerous variations and modifications, which may be made by those skilled in the art. Thus, the invention is to be construed as being limited only by the spirit and scope of the appended claims.

INDUSTRIAL APPLICABILITY

The invention has applicability to the fastener manufacturing industry.

The invention claimed is:

1. An improved tool assembly for installing a grommet inserted in a hole in a panel, the hole having a first end and a second end having a tapered countersink portion, the grommet having a tubular body with an internal bore and a head portion abutting the first end of the panel and the second end extending out of the second end of the panel, the improved tool assembly comprising:

an anvil having a bore there through and a convex curved surface for contacting the head of the grommet such that said curved surface contacts only the area of the head about the internal bore of the grommet;

a flaring die for flaring the second end of the grommet into the counter sink portion of the panel, said flaring die having a tapered tubular portion for inserting into the second end of the grommet, a conical surface for flaring the second end of the grommet and a griping surface for preventing rotation of the die when griped and an internal hole there though;

means for contacting said anvil and said flaring die for pulling said anvil and said die toward each other;

such that when said means pulls said anvil and said die toward each other said die moves into the second end of the grommet flaring it into contact with the countersink portion of the hole of the panel locking the grommet in place.

2. The improved tool assembly as set forth in claim 1 wherein said convex surface of said anvil has a radius of curvature of between 8.8 to 13.1 inches.

3. The improved tool assembly as set forth in claim 1 wherein said tapered tubular portion has a taper angle of between 0.266 to 0.443 degrees.

4. The improved tool assembly as set forth in claim 3 wherein the surface finish of said tapered tubular portion is 16 RMS.

5. The improved tool assembly as set forth in claim 1, or 2 or 3, or 4, wherein said means comprises:

said flaring die includes internal threads extending at least a portion of said internal bore there of;
a threaded mandrel rod having first and second ends said for extending through said internal bore of said anvil, through the internal bore of the grommet with said first end engaging said internal threads of flaring die; and actuation means for rotating said rod when said rod extends through said internal bore of said anvil, through the internal bore of the grommet and engages said internal threads of flaring die, said flaring die moves into the second end of grommet flaring it into contact with the countersink end of the hole in the panel.

6. The improved grommet installation tool of claim 5 wherein:

said actuation means includes a powered tool coupled to said second end of said threaded mandrel rod for rotating same causing said die to move into the second end of the grommet; and
means to prevent rotation of said flaring die when said rod is rotated.

7. The improved grommet installation tool of claim 5 wherein:

said second end said threaded mandrel rod terminates in a wrenching member;
a wrench for engaging said wrenching member for rotating said rod, and
means to prevent rotation of said flaring die when said rod is rotated.

* * * * *